United States Patent [19]
Beery et al.

[11] 3,873,901
[45] Mar. 25, 1975

[54] AUTOMATIC TORQUE CONTROL SYSTEM FOR MOTORS

[75] Inventors: Jack Beery, Farmington; Arnold W. Brandt, Milford, both of Mich.

[73] Assignee: Burroughs Corporation, Detroit, Mich.

[22] Filed: Mar. 30, 1973

[21] Appl. No.: 346,347

[52] U.S. Cl................. 318/332, 318/345, 318/432
[51] Int. Cl. ........................................... H02p 7/00
[58] Field of Search ............ 318/308, 332, 432, 345

[56] References Cited
UNITED STATES PATENTS

| | | | |
|---|---|---|---|
| 3,500,161 | 3/1970 | Domann et al. ..................... | 318/308 |
| 3,515,971 | 6/1970 | Joslyn et al. ......................... | 318/308 |
| 3,543,115 | 11/1970 | Grygera ............................. | 318/308 |
| 3,694,720 | 9/1972 | Nakajima ........................... | 318/308 |
| 3,707,660 | 12/1972 | Nijhof et al. ....................... | 318/308 |

*Primary Examiner*—G. Z. Rubinson
*Attorney, Agent, or Firm*—Michael B. McMurry; Edwin W. Uren; Edward G. Fiorito

[57] ABSTRACT

Disclosed is circuit means for controlling the torque of the servo motor with respect to the speed of the servo motor. This system finds particular application in document feed apparatus where it is useful to maintain constant torque over a range of speeds. The control circuit includes a speed sensing element, switching elements and a servo amplifier for applying power to the servo motor. This system may also be adapted to compensate for the damping constant of the servo motor.

14 Claims, 3 Drawing Figures

AUTOMATIC TORQUE CONTROL SYSTEM FOR MOTORS

BACKGROUND OF THE INVENTION

The inventive concept disclosed herein was created to facilitate the operation of a document feed apparatus. This relates generally to the apparatus disclosed in the copending application Ser. No. 181,525 entitled "Controlled Torque Document Feed System" by Beery et al., filed Sept. 17, 1971. It was discovered that in order to better control the movement of documents it was necessary to accurately govern the torque of the document drive motor to allow for constant torque over the lower speed range of the document drive motor instead of controlling the torque by sensing the position of the document. By controlling the low speed torque of the document drive motor the most optimum force can be applied to each document thereby alleviating clumping and other related problems in the transport of documents. In order to solve this problem, the circuitry as set forth in this disclosure was developed to provide for the controlling of the torque of a servo motor over a wide range of speeds.

SUMMARY OF THE INVENTION

It is accordingly an important object of the present invention to provide circuit means for controlling the torque of a servo motor over its entire speed range.

It is a further object of the invention to provide means of compensating for the damping constant of a motor over a wide range of speeds.

It is an additional object of the invention to provide a means of controlling the torque of a servo motor within a document feed apparatus.

Another object of the invention is to provide a means for reducing the stress on a servo system by providing for constant torque of the motor as it accelerates or decelerates.

The circuitry itself is composed of a number of elements the first of which is a speed sensing device of which the primary element would be a tachometer coupled to the motor. This speed sensing device outputs a signal that is proportional to the speed or the rate of rotataion of the servo motor. The second element is a switch circuit which provides the capability of selecting either voltage or current control of the servo motor. The third basic element is the servo amplifier which in the invention is responsive both a voltage input or a current input and whose primary function is to control the power input to the servo motor. The last major element of the circuitry disclosed herein is and on/off control circuit for responding to logic signals from the document feed apparatus or the like.

In describing the operation of the torque circuitry, it will be assumed that the motor will initially be at rest. In this initial condition the switch circuit will be set to cause the servo amplifier to apply maximum voltage to the servo motor for maximum torque in response to a signal from the on/off control circuit. As the motor begins to rotate the speed sensing circuit will provide a voltage output that is proportional to the speed of the motor to the switch circuit. When the speed of the motor reaches a predetermined velocity the switch circuit will cause the servo amplifier to become directly responsive to the current output of the servo motor instead of applying the maximum voltage output to the motor. By maintaining the voltage applied to the motor proportional to its speed there will result a constant torque output by the servo motor for a range of speeds. In keeping the torque of the motor constant the stress on the servo system as a whole may be reduced to a minimum.

In addition various types of circuit elements such as an amplifier can be inserted between the speed sensing circuit and the servo amplifier that will effectively compensate for the damping constant of the servo motor.

DETAILED DESCRIPTION OF THE INVENTION

The preferred embodiment of the invention will be discussed within the context of improving the torque control characteristics of the document drive motor in the document feed system as disclosed in the copending application Ser. No. 181,525 entitled "Controlled Torque Document Feed System" by Beery et al. filed Sept. 17, 1971.

Figure 1:
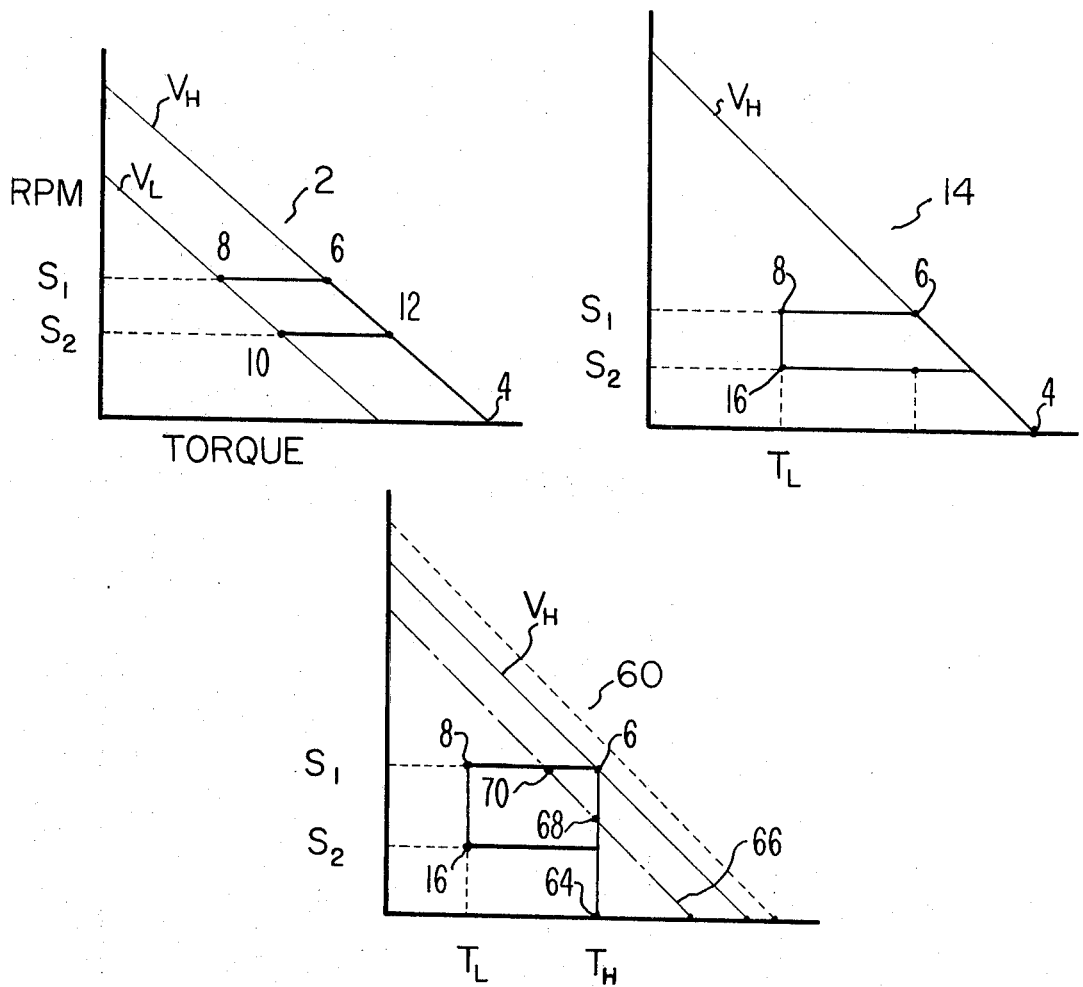
FIG. 1 illustrates graphically various relationships between the torque and speed of a servo motor.

In FIG. 1 are shown torque versus RPM graphs for various servo motors and their control systems. As can be seen from the first graph 2 there is a basically linear relationship between the torque and the speed of a motor which is indicated by the line labeled $V_H$. Prior to the development of the disclosed invention the servo motor utilized in the feed device, as is characteristic with most servo motors, had the torque-RPM characteristics as shown in graph 2. In normal operation the motor would be accelerated from zero speed at point 4 of FIG. 1 at voltage $V_H$ until it reached speed $S_1$, at point 6 on the $V_H$ line. At this point a switching circuit would drop the voltage input to the motor as represented by line $V_L$ resulting in a lower torque produced by the motor as shown by point 8. Then under increasing load conditions when the load on the motor was such that the speed dropped to $S_2$, point 10 on line $V_L$, the motor switching circuit would then cut in the higher voltage $V_H$ to the motor thereby causing an immediate increase in torque point 12 and the speed of the motor would tend to increase from $S_2$ to $S_1$. As can be seen from slopes of the lines $V_H$ and $V_L$ of FIG. 1 there is a significant variation in torque produced by the servo motor for the various speeds. It was this variation in the torque that was causing clumping in the document feeding system of Serial Number 181,525.

Figure 2:
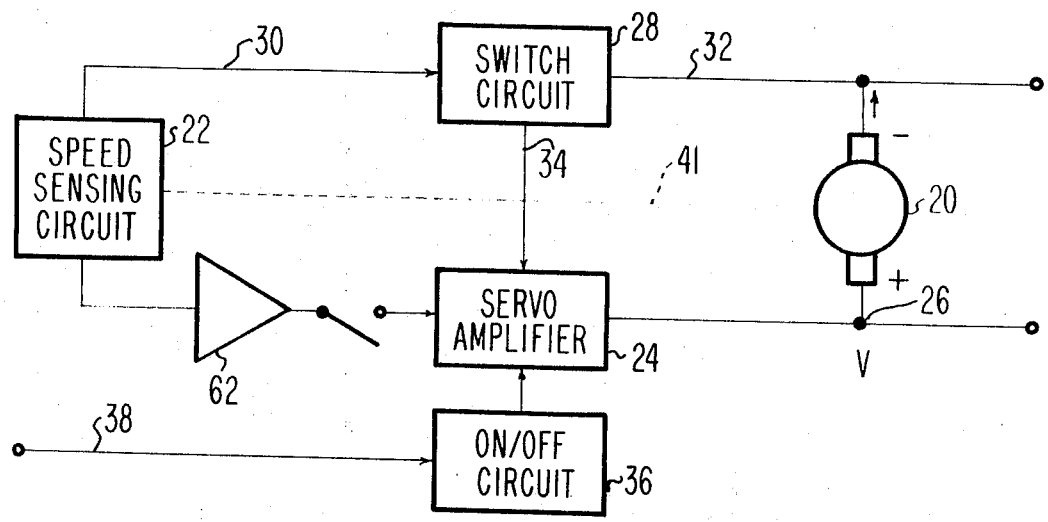
FIG. 2 is a block diagram of the servo motor control circuitry.

Therefore the circuitry as summarized in the block diagram in FIG. 2 was developed so that a constant torque could be applied to the documents over varying speeds of the motor.

The primary object in overcoming the aforementioned difficulties in the document feeding system was to provide a means for applying constant torque between speeds $S_1$ and $S_2$ on the servo motor. The graph 14 in FIG. 1 illustrates the application of the inventive concept to maintain the constant torque, $T_L$ between speeds $S_1$ and $S_2$. The motor initially starts at point 4 and accelerates along the constant higher voltage line $V_H$ until it reaches point 6 which is speed $S_1$. At this point the switching circuit which is responsive to the speed of the motor will drop the torque to $T_L$ at point 8 by reducing the voltage on the servo motor. Unlike the operation of the servo motor as shown in graph 2, the circuitry shown in FIG. 2 will control the voltage applied to the servo motor in order to keep the torque constant between the speeds $S_1$ and $S_2$. If the motor should drop to speed $S_2$ shown at point 16 of FIG. 1, the switch circuit will automatically apply $V_H$ to the motor and increase the torque and the speed of the motor until it reaches point 6 of graph 14. In this manner the lower torque $T_L$, may be controlled so that a constant torque is applied to documents in the document feed system.

In FIG. 2 there is illustrated in block diagram form the preferred circuitry for accomplishing these ends. In the diagram of FIG. 2 the servo motor 20 is mechanically coupled to the speed sensing circuit 22. The servo amplifier 24 applies a positive voltage to the servo motor 20 at terminal 26 in order to drive the servo motor. The switch circuit 28 responds to the speed sensing circuit 22 and when the voltage signal on line 30 reaches a certain predetermined value the switch circuit will cause the servo amplifier 24 to respond to the current output of the motor 20 over lines 32 and 34. The on/off circuit 36 serves to switch the servo amplifier on in response to logic signals over line 38 from the document feed apparatus.

At this juncture, with reference to the graph 14 shown in FIG. 1, the operation of the circuits illustrated in FIG. 2 will be explained. In response to a logic signal over line 38 the on/off circuit 36 will enable the servo amplifier 24 to apply a high voltage or the motor voltage indicated by $V_H$ in graph 14 to the motor at terminal 26. The motor will then accelerate along line $V_H$ until it reaches point 6 whereupon the switch circuit 28 will respond to the voltage produced by the speed sensing circuit 22. At this speed $S_1$, the switch circuit will then cause the servo amplifier 24 to respond directly to the value of the current output of the motor 20 as signaled on lines 32 and 34 so that the motor will maintain the constant torque $T_L$. When the speed of the motor drops to $S_2$, at point 16 of graph 14, the switch circuit 28 will cause the servo amplifier to again apply voltage $V_H$ the motor voltage to the servo motor thereby increasing the torque and hence the speed of the motor to $S_1$. Therefore it is by means of the speed sensing circuits 22 and the switch circuit 28 that the servo amplifier 24 is controlled to apply the correct voltage to the servo motor for regulating its torque output.

Figure 3:
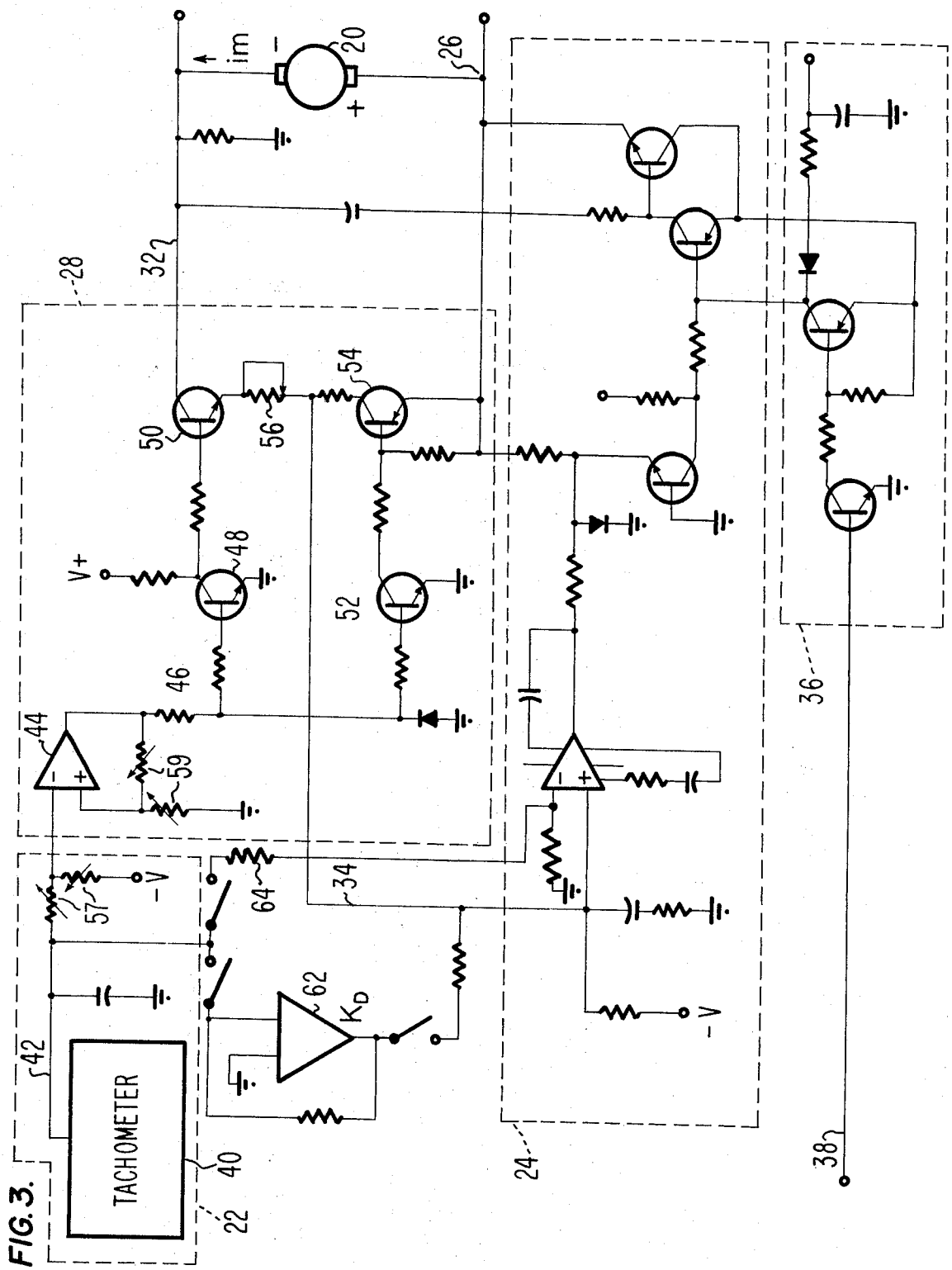
FIG. 3 is a schematic of the servo motor control circuitry.

A detailed schematic of the circuit elements that make up the block diagram of FIG. 2 is shown in FIG. 3. The motor is coupled to the tachometer as shown by the line 41 in FIG. 2 so that in the preferred embodiment the tachometer 40 will generate a signal on line 42 directly proportional to the speed of the motor 20. This signal is then applied to the switching amplifier 44. The switching amplifier as shown at 44 applies a positive voltage on line 46 when the input voltage on line 42 is below a predetermined value. When the voltage on line 42 exceeds a predetermined value, which in the preferred embodiment will be equivalent to the voltage generated by the tachometer 40 at speed $S_1$, the switching amplifier will switch placing a zero or a low voltage on line 46. It is therefore the switching amplifier 44 that initiates switching operation of the switch circuit 28. Initially when there is a relatively low voltage on line 42 due to the fact that the motor is rotating below speed $S_1$ the switching amplifier will be set to produce a high voltage on line 46. This will cause transistor 48 to conduct resulting in transistor 50 becoming non-conductive. For the same reason, transistor 52 will be in a conductive state thereby allowing transistor 54 to conduct. When transistor 54 is in a conducting state there will then be a voltage applied to the servo amplifier 24 over line 34 that represents the input voltage of the motor 20. The net result of this particular voltage on line 34 will be to cause the servo amplifier 24 to apply the maximum voltage, referred to as the motor voltage which is equivalent to $V_H$ of FIG. 1, to the motor at terminal 26. In the preferred embodiment $V_H$ will be the saturation voltage of the servo amplifier which will cause the servo motor to accelerate along line $V_H$ until it reaches speed $S_1$ of FIG. 1.

The motor will eventually reach the speed, $S_1$ of FIG. 1, wherein the voltage generated by the tachometer 40 on line 42, will cause the switching amplifier 44 to change state and place a low voltage on line 46. This will result in the transistor 48 being turned off. When transistor 48 is off, transistor 50 will be in a conducting state thereby permitting the output current of the motor $I_M$ to flow through the adjustable resistor 56 to the servo amplifier 24. This will place the circuitry approximately at point 8 of FIG. 1. At this point since there is a low value of voltage on line 46 transistor 52 will be off or non-conducting thereby causing transistor 54 to be in a non-conducting state so that the input voltage to the motor 26 will no longer be represented on line 34. This will immediately cause a drop of the input voltage 26 to the motor as is shown at point 8 of FIG. 1. Cognizance should be taken of the fact that by adjusting the resistors 57 and 59 the voltage at which the switching amplifier will switch and hence the values of the speeds $S_1$ and $S_2$ can also be readily changed.

At this stage of the circuit operation, the output current of the motor $I_M$ is allowed to flow through the variable resistor 56 and hence through the line 34 to the servo amplifier. It will be apparent from FIG. 3 that the input voltage 26 to the motor will be directly proportional to the motor's output current. Therefore, as the speed of the motor decreases from $S_1$ of FIG. 1 to $S_2$, the motor current $I_M$ will decrease thereby causing the servo amplifier voltage at 26 also to decrease resulting in an essentially constant torque output by the motor. This constant torque $T_L$ output will correspond to the line between point 8 and point 16 of the graph 14 in FIG. 1. It should also be noted, at this point, that values of the adjustable resistor 56 may be selected so that the line defined by point 8 and point 16 of FIG. 1 can take on a plurality of slopes resulting in any number of individual torque characteristics for the system.

When the speed of the motor is reduced to $S_2$ as shown at 16 of FIG. 1, the voltage as generated by the tachometer 40 on line 42 will have dropped to the point where the switching amplifier 44 will change state thus producing a high voltage on line 46. This will have an effect, as described before, of applying the full voltage $V_H$ on the motor 20. It can therefore be clearly seen from this description of the preferred embodiment that the servo motor will have the torque speed characteristics as shown in graph 14 of FIG. 1.

In addition to controlling the torque as shown in graph 14 of FIG. 1, the circuitry shown in FIG. 3 may also be used to control the torque of the servo motor as shown in graph 60 of FIG. 1. For example the starting torque $T_H$ may be controlled in addition to the lower torque $T_L$. This is accomplished as shown in FIG. 3 and FIG. 2 by inserting the amplifier $K_D$ at 62 into the circuit. In the preferred embodiment of the invention the gain of the amplifier 62 would be equivalent to the damping constant $K_D$ of the servo motor 20. The basic relationship between the output current $I_M$ and the speed of a servo motor is shown in the following simplified equation:

$$I_M = \frac{(K_D \times N) + T_F + T_L}{K_T}$$

where:
$K_D$ is the damping constant
$N$ is the rotational speed of the motor
$T_F$ is the frictional torque
$T_L$ is the load torque
$K_T$ is the ratio output torque to armature current.

As can be seen from the above equation, as the speed of the motor $N$ increases the current $I_M$ must increase in proportion to the damping constant $K_D$ in order to maintain the torque $T_L$ at a constant level. By inserting the amplifier 62 in the circuit of FIG. 3 and by placing an initial starting voltage on, for example line 42, the starting torque at point 64 may be generated at any desired value. As the motor 20 begins to pick up speed, the voltage on line 42 will be multiplied by the $K_D$ factor in amplifier 62. This voltage will then be input to the servo amplifier 24 thereby increasing the voltage 26 on the motor 20 and resulting in the torque output of the motor being maintained constant at $T_H$ until the motor reaches the speed $S_1$ at point 6 of FIG. 1. At this point the switching amplifier 44 will switch states and, as has been described before, cause the input voltage to the motor to become directly responsive to the output current $I_M$ of the motor. It therefore can be seen that by selecting the correct values for the amplifier 62 and the variable resistor 56 that the torque versus speed characteristics of the motor 20 speed can be maintained in any desired manner. The torque versus speed characteristics for the motor can also be altered by inserting other circuit elements such as the resistor 64 between the tachometer 40 and the servo amplifier 24 instead of the amplifier 62.

As is additionally shown in graph 20 of FIG. 1, the selection of the saturation voltage of the servo amplifier 24 will effect the speed versus torque characteristics of the motor. For example, if the saturation voltage is as indicated by the line 66 of graph 60, the motor under the control of the circuitry of FIG. 3 will accelerate with constant torque to point 68 then up along line 66 until it reaches speed $S_1$ at point 70. It should be further apparent therefore that by the selection of values of the saturation voltage of the servo amplifier 24, the adjustable resistance 56, the amplification factor of the amplifier 62, the resistance 57 and 59 and the other values for the circuit of FIG. 3 virtually any torque versus speed relationship for a servo motor may be established.

What is claimed is:

1. A torque control system for a servo motor comprising:
   speed sensing means;
   a servo amplifier for providing input voltage to the motor; and
   switching means responsive to said speed sensing means for switching the input to said servo amplifier from a voltage representing the motor voltage to a voltage representing the motor output current.

2. The torque control system of claim 1 wherein said speed sensing means includes a tachometer coupled to said motor.

3. The torque control system of claim 1 wherein said switch means comprises a switching amplifier and an electronic switch responsive to said switching amplifier and operative to switch the input of said servo amplifier from the voltage representing the motor voltage to the voltage representing the motor output current.

4. An improved motor control system for a document feed apparatus having a servo amplifier for providing input voltage to the motor wherein the improvement comprises:
   a speed sensing means; and
   a switching means responsive to said speed sensing means for switching the input to the servo amplifier from a voltage representing the motor voltage to a voltage representing the motor output current.

5. The improved motor control system of claim 4 wherein said switch means comprises:
   a switching amplifier; and
   an electronic switch responsive to said switching amplifier.

6. A torque control system for a servo motor comprising:
   a servo amplifier for providing input voltage to the motor;
   speed sensing means;
   switching means responsive to said speed sensing means for switching the input to said servo amplifier from a voltage representing the motor voltage to a voltage representing the motor output current; and
   circuit means connected between said speed sensing means and said servo amplifier for inputting to said servo amplifier a voltage representing the speed of the motor.

7. The torque control system of claim 6 wherein said speed sensing means is a tachometer coupled to the motor.

8. The torque control system of claim 6 wherein said switch means comprises:
   a switching amplifier; and
   an electronic switch responsive to said switching amplifier.

9. The torque control system of claim 8 wherein said switching amplifier includes adjustable resistive means for varying the response of said switching amplifier with respect to various speeds of the motor.

10. The torque control system of claim 6 wherein said circuit means includes at least one amplifier.

11. A torque control system for compensating for the damping constant of a servo motor comprising:
    a servo amplifier;
    speed sensing means;
    a switching circuit responsive to said speed sensing means for switching input to said servo amplifier from a voltage representing the motor voltage to a voltage representing the motor output current;
    a compensating circuit connected between said speed sensing circuit and said servo amplifier for providing an input signal to said servo amplifier proportional to the speed of the motor.

12. The torque control system of claim 11 wherein said compensating means includes amplifier means with a gain substantially equal to the damping constant of the motor.

13. A control system for maintaining the torque output of a motor constant over a range of speeds of the motor, comprising:
   a servo amplifier;
   speed sensing means; and
   circuit means connected to said speed sensing circuit and said servo amplifier for inputting a signal to said servo amplifier representing the speed of the motor.

14. The control system of claim 13 wherein said circuit means includes at least one amplifier.

* * * * *